Patented Oct. 22, 1940

2,219,010

UNITED STATES PATENT OFFICE 2,219,010

MANUFACTURE OF INDOPHENOL-LIKE COMPOUNDS OF THE NAPHTHOCARBAZOLE SERIES

Walter Hagge and Herbert Bach, Wolfen, Kreis Bitterfeld, Germany, assignors to General Aniline & Film Corporation, a corporation of Delaware No Drawing. Application April 4, 1939, Serial No. 265,937. In Germany April 13, 1938

7 Claims. (Cl. 260—317)

This invention relates to the manufacture of indophenol-like compounds of the naphthocarbazole series.

In U. S. Patent No. 1,898,445 there is described the manufacture of indophenols or leuco-indophenols by causing naphthocarbazoles to react with quinone-chlorimide. That process may be applied to isomeric naphthocarbazoles and their N-alkyl derivatives and to substitution products of these compounds containing at least one free para-position with respect to the carbazole nitrogen atom.

The present invention is based on the observation that the 3.4.5.6-dinaphthocarbazole (melting at 159° C.) and its N-substitution products, which are obtainable as described in German Specification No. 624,563 by reaction of 2.2'-dihydroxy-1.1'-dinaphthyl with ammonia or a primary amine respectively at a temperature above 200° C., can react with para-quinone-chlorimide or with para-nitrosophenol notwithstanding that they have no free para-position with respect to the carbazole nitrogen atom. Blue indo-compounds are formed which may be used for the manufacture of dyes.

The following examples illustrate the invention, the parts being by weight unless otherwise stated; the relationship of parts by weight to parts by volume is that of the kilo to the litre:

*Example 1.*—13.3 parts of 3.4.5.6-dinaphthacarbazole are introduced, while stirring at about —10° C., into 150 parts by volume of sulfuric acid of 66° Bé.; a solution of 10.6 parts of para-quinone-chlorimide in 100 parts by volume of sulfuric acid cooled, likewise, to —10° C. is then added to the mixture. Stirring is continued for a short time. The deep-blue solution may then be worked up either, as usual, by pouring it on ice or, preferably, by reducing it, while pouring it on ice, by strewing sodium hydrosulfite into it, whereby the leuco-compound separates in the form of light-yellow flakes. The product is filtered with suction and washed with water.

*Example 2.*—5.3 parts of 3.4.5.6-dinaphthocarbazole are introduced, at a temperature of —10° C., into 50 parts by volume of sulfuric acid of 60° Bé., and a cooled solution of 3 parts of para-nitrosophenol in 60 parts by volume of sulfuric acid is then added; after stirring for half-an-hour to one hour, the mass in introduced into ice, sodium hydrosulfite being strewn in; the product is then filtered with suction and washed. The leuco-compound obtained dissolves in a warm caustic soda solution of 3 per cent strength to a yellow solution, as does the compound obtained as described in Example 1; by means of a sodium hypochlorite solution, the product is oxidized to form the blue indo-body.

*Example 3.*—14 parts of N-methyl-3.4.5.6-dinaphthocarbazole (cf. Example 2 of German Specification No. 624,563) obtainable by reaction of 2.2'-dihydroxy-1.1'-dinaphthyl with methylamine, are dissolved, at a temperature of —10° C., in 150 parts by volume of sulfuric acid of 60° Bé., and a solution of 10.6 parts of para-quinone-chlorimide in 100 parts by volume of sulfuric acid cooled to the same temperature is added thereto. After a short time, the deep-blue solution is poured on ice, while stirring, sodium hydrosulfite being added. The light-yellow leuco-compound obtained dissolves in a dilute caustic soda solution more sparingly than does the corresponding compound from 3.4.5.6-dinaphthocarbazole; it dissolves, however, easily on addition of a small amount of ethanol. By means of sodium hypochlorite, the product is oxidized to form the blue indo-compound.

*Example 4.*—31.1 parts of N-hydroxyethyl-3.4.5.6-dinaphthocarbazole are introduced at a temperature of —10° C. in 250 parts by volume of sulfuric acid of 60° Bé., and a solution of about 20 to 25 parts of para-quinone-chlorimide in 170 parts by volume of sulfuric acid cooled to about the same temperature is added to the said mixture. After a short time the reaction mixture is poured on ice, whereat simultaneously sodium sulfite or hydrosulfite is added in order to form the leuco-indophenol. The product is then filtered and washed with a sodium chloride solution.

It is obvious that our invention is not limited to the foregoing examples or to the specific details given therein and we wish to state that according to our invention generally indophenol-like compounds are obtainable by reacting a 3.4.5.6-dinaphthocarbazole of the general formula:

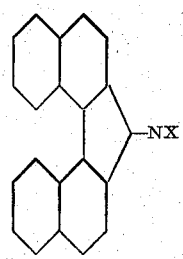

wherein X means hydrogen, alkyl or hydroxylkyl, with para-quinone chlorimide or para-nitrosophenol respectively. The products thus obtainable have the dyeing properties of indophenols and may be worked up to form sulfur dyes of excellent properties.

What we claim is:

1. The process which comprises reacting a 3.4.5.6-dinaphthocarbazole of the general formula:

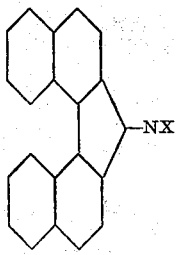

wherein X means a radical of the group consisting of hydrogen, alkyl and hydroxyalkyl, with a compound of the group consisting of para-quinone-chlorimide and para-nitrosophenol.

2. The process which comprises distributing a 3.4.5.6-dinaphthocarbazole of the general formula:

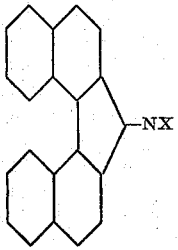

wherein X means a radical of the group consisting of hydrogen, alkyl and hydroxyalkyl, in sulfuric acid of about 60° Bé., at a temperature of about −10° C., and adding a solution of a compound of the group consisting of para-quinone-chlorimide and para-nitrosophenol in sulfuric acid of about 60° Bé., cooled to about −10° C., pouring the blue solution formed on ice while adding a reducing agent of the group consisting of sodium hydrosulfite and sodium sulfite.

3. The process which comprises introducing 3.4.5.6-dinaphthocarbazole in sulfuric acid of about 60° Bé. at about −10° C., adding para-quinone-chlorimide dissolved in sulfuric acid of about 60° Bé. at a temperature of about −10° C., pouring the blue solution formed on ice and reducing the product formed to form the leuco-compound.

4. The process which comprises introducing N-methyl-3.4.5.6-dinaphthocarbazole in sulfuric acid of about 60° Bé. at about −10° C., adding para-quinone-chlorimide dissolved in sulfuric acid of about 60° Bé. at a temperature of about −10° C., pouring the blue solution formed on ice and reducing the product formed to form the leuco-compound.

5. The indophenol prepared in accordance with the process claimed in claim 1.

6. The indophenol prepared in accordance with the process claimed in claim 2.

7. The indophenol prepared in accordance with the process claimed in claim 3.

WALTER HAGGE.
HERBERT BACH.